Oct. 16, 1956 J. ROCKOFF 2,766,801
LAMINATED ARTICLES SUCH AS PNEUMATIC TIRES
Filed March 13, 1953
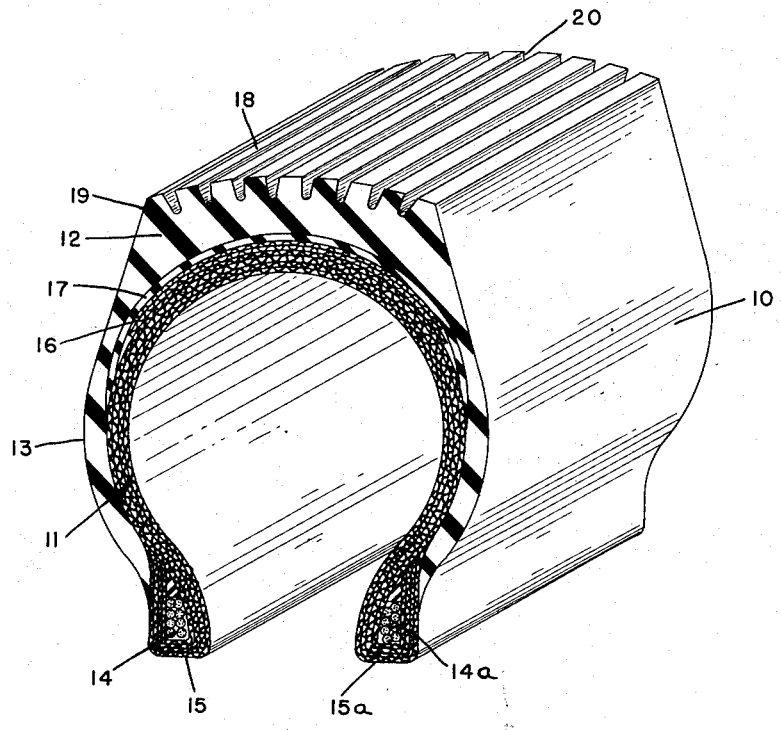
INVENTOR.
JOSEPH ROCKOFF
BY
ATT'Y.

United States Patent Office 2,766,801
Patented Oct. 16, 1956

2,766,801

LAMINATED ARTICLES SUCH AS PNEUMATIC TIRES

Joseph Rockoff, Dayton, Ohio, assignor to The Dayton Rubber Company, a corporation of Ohio Application March 13, 1953, Serial No. 342,175

3 Claims. (Cl. 152—354)

The present invention relates to laminated articles and in particular to pneumatic tires made partly from high Mooney viscosity synthetic rubber-like compositions, such as the butadiene-styrene copolymers commonly referred to as Buna–S or GR–S.

In the recent development of the use of the various synthetic rubber-like compositions in pneumatic vehicular tires and the like, many variations of the synthetic compounds have been tried. Of late it has developed that the high Mooney viscosity synthetic rubbers, and particularly high Mooney viscosity Buna–S, are adaptable for use in the tread portion of the tire casing. Playing a part in this adaptability of the highly viscous butadiene-styrene copolymer has been the fact that the same has fairly good resistance to heat build-up as compared with compositions commonly used in tread stocks and that these compounds are extremely tough and offer exceptional resistance to abrasive wear.

In order to bring such viscous substances within the range of plasticity at which they may be worked on standard rubber working machinery and also in order to obtain the aforementioned desired properties of resistance to heat build-up and the like, it has been found desirable to add large quantities of plasticizers, usually in the form of petroleum oils, to the rubber-like copolymer. Three methods are commonly practiced for compounding the oil with this high Mooney viscosity synthetic rubber. In the first of such methods, the oil may be emulsified in water and added to the synthetic rubber latex prior to coagulation and addition of pigments. In the second method, a slurry of the pigments may be added to the latex and the oil emulsion added to this mixture prior to coagulation. Finally, the rubber composition may be mixed dry with the oil and pigments in a Banbury mixer or on a mill.

Since the plasticizing oils are considerably less expensive than the rubber-like composition, the "extension" of the rubber composition with this inexpensive material, particularly where the rubber composition involved is one that has little use in the industry at the present time unless it is so plasticized, is greatly desired both as a matter of fully utilizing the materials that are presently available and of effecting considerable savings in raw material costs.

A description of the high Mooney viscosity synthetic rubber involved in the present invention is set forth in a paper by Swart, Pfau and Weinstock published at page 309, volume 124, of "India Rubber World," the June 1951 issue thereof. By way of summary, this paper discloses that those synthetic rubbers normally referred to as of the high Mooney viscosity type, are those which, in their uncompounded state, range from 74 to 156 Mooney readings. The term high Mooney viscosity rubber is commonly accepted in the rubber compounding art as referring to those rubbers having such a high viscosity that they are ordinarily considered impractical for use in rubber goods unless they are highly plasticized with from 20 to say 100 parts of a plasticizing oil. It is to be understood, of course, that even higher Mooney viscosity stocks may be made available and may, according to the procedures already known, be plasticized to be made practical for use in rubber goods. The present invention, of course, is not limited to any maximum of Mooney readings, but is intended to include all of those rubberlike polymers which are originally plasticized with at least 20 parts of oil to 100 parts of the rubberlike polymer in order to bring them within the range of plasticity at which they may be worked on standard rubber machinery and employed in rubber articles such as tires.

Despite the desirable aspects of the application of such material for use in tire tread composition, experience has shown that tires so constructed have been subject to premature failures particularly with regard to separation of the tread or sidewall portions containing a relatively high percentage of the petroleum oil plasticizer from the cord fabric or carcass portion of the tire. Previous attempts to remedy these defects and premature failures by means of varying the compounding ingredients and the types of adhesives employed in the building of the tire have heretofore been largely unsuccessful.

The present invention is based upon the theory that previously encountered failure in the form of separation at the point of adhesion between the oil extended composition and the carcass portion has resulted from the migration of the petroleum oil plasticizer from the oil extended stock into the carcass portion of the tire where it has had a deteriorating effect upon the natural rubber with which the plies of cord fabric forming the carcass portion are impregnated and upon which they rely to a large extent for their strength and cooperative resistance to wear. It is accordingly proposed that, to prevent the aforementioned undesirable migration of the plasticizer into the carcass portion, a barrier of a composition which will resist such migration and at the same time possess such physical properties as are necessary for a pneumatic tire component, be included in the tire structure.

It is accordingly an object of the present invention to provide a laminated article comprising layers of highly plasticized rubber-like composition in proximity to layers including oil soluble material wherein separation between the layers of plasticized material and those containing oil soluble material will be prevented.

It is another object of the present invention to provide a pneumatic tire casing composed at least partially of highly plasticized high viscosity synthetic rubber-like composition.

It is yet another object of the present invention to provide such a pneumatic tire which will be capable of performing for extended periods of time without separation of the components thereof.

It is a further object of the present invention to provide a method for the manufacture of vehicular tires having a highly plasticized synthetic rubber-like composition therein.

These and other objects and advantages of the present invention will be apparent from a reading of the following detailed description for the clarification of which reference may be had to the appended drawing.

The drawing is a view in perspective and cross section of a typical tire casing incorporating the novel features of this invention.

A typical tire casing 10 comprises an inner laminated carcass portion of superimposed plies of rubber impregnated fabric 11, and outer tread portion 12 composed of a rubber-like composition, usually a compound of a butadiene styrene copolymer or the like, a sidewall portion 13 of similar rubber-like material and inextensible bead members such as 14 and 14a which are usually composed of a stranded metallic wire or cable. The rubberized fabric layers of the carcass portion 11 are wrapped around the bead member 14 and, upon molding and vulcanization, form the lugs such as 15 and 15a for engagement with the rim upon which the tire is mounted. These fabric layers or plies are actually layers of parallel cords applied on a bias. The cords are applied as fabric spaced and held together for purposes of convenience in application by light threads or picks running transversely of the cords. In order to facilitate adhesion of the cords to the rubber through vulcanization, this fabric is impregnated with a special natural rubber latex dip prior to incorporation in the tire. In tires designed for heavier loads such as truck tires, additional fabric portions at points of greatest flexing and road shock, such as those layers shown at 16, are employed between the fabric carcass portion 11 and the outer portion such as tread portion 12 and/or the sidewall portion 13 of the tire. The fabric portion positioned such as that at 16 is usually referred to as the breaker and will be considered a part of the carcass portion.

Since the carcass portion 11 is completely surrounded by rubber on the outside and defines an enclosed chamber within its inner surface, the heat which is formed by the flexing of this carcass portion while the tire is in use, has a tendency to build up to the point at which it will cause premature deterioration of the rubber-like composition on which the several layers rely for their integration and cooperative strength, resistance to road shock and the like. Because of this tendency for heat to build up within the carcass portion of the tire, it has been found desirable in most cases to impregnate the fabric plies of the carcass portion with a natural rubber composition in view of the fact that natural rubber has a better resistance to heat build-up than do the synthetic rubber-like compositions which have become prominent in the pneumatic tire field. Another reason for the preference of natural rubber compositions for use in the fabric portions of the tire is the fact that the working properties of these compositions are such that they may be applied to the fabric with greater ease and uniformity than the synthetic rubbers. While it is, of course, true that resistance to heat build-up at the outer rubber portions of the tire, such as the tread 12 and the sidewall 13, is to be desired, physical properties of greater importance as to these portions are compressive strength, abrasive resistance, high modulus of elasticity and the like.

It has recently been discovered that in these outer rubber portions particularly in the tread portion of the tire, the highly viscous synthetic rubber-like copolymers have particular adaptability. Before such compositions can be used, however, they must be reduced to a considerably lower viscosity by the addition, according to the above-enumerated methods, of plasticizers which are usually in the form of petroleum oils or the like. These oils are generally hydrocarbon materials of petroleum origin obtained from the higher molecular weight portion of petroleum, and include the lubricating oil, rubber processing oil, and asphaltic oil fractions. These oils may be predominantly aromatic, naphthenic, or aliphatic in character, although the heavy or asphaltic petroleum fractions are generally mixtures of the three types of hydrocarbons in varying proportions depending on their origin, and include complex compounds having aliphatic and naphthenic and/or aromatic radicals.

A typical tread composition employing this high viscosity synthetic composition and the plasticizing oils is one according to the following proportions by weight:

| | Parts |
|---|---|
| GR-S, cold rubber oil masterbatch including 25 parts highly aromatic heavy-process oil (Sundex 53) | 125 |
| Zinc oxide | 3 |
| Antioxidant (phenyl-beta-naphthylamine) | 1 |
| H. A. F. carbon black | 60 |
| Softener (Sundex 53) | 5 |
| Sulfur | 1.75 |
| Accelerator (N-Cyclohexyl-2-Benzothiazole Sulfonamide | 1 |

Typical compounds such as the one described above usually include the petroleum oil plasticizer or extender in the weight proportion range of from 25 to 50 parts of plasticizer to 100 parts of the rubber-like substance.

Although tread compositions as explained above are particularly adaptable to use in outer tread portions, particularly in view of their low cost and relatively good resistance to heat build-up, it has been found that tires including such compositions in their tread portions have failed prematurely and have otherwise proven unsatisfactory due to separation at points of contact between the oil extended rubber-like composition and the laminated carcass portion or other tire portions containing natural rubber.

As previously explained, applicant's recognition of this migratory problem and the resultant deteriorating effect upon the natural rubber within the carcass portion as opposed to the previously proposed belief that the separation between the tread and the carcass portion resulted from failure of the adhesives and bonding agents employed, led to his interposition between these respective portions of a thin barrier layer 17. This barrier, being composed of an oil-resistant substance designed to prevent the migration of the oil from the tread composition into the carcass portion, accordingly eliminates in the first instance, any possible deterioration of the natural rubber within the carcass portion as a result of migration thereinto of the oil plasticizer. Such a barrier as 17 in the drawing may vary in gauge or thickness depending upon the amount and migratory tendencies of the plasticizer used in the tread portion and ordinarily falls within the range of from .010 in to .200 in. The width of this barrier will vary in accordance with the interior peripheral dimensions of the oil extended portions employed in the tire. In the ordinary passenger tire, for example, such oil extended rubber-like material may be present in the tread portion only which comprises the non-skid area 18, the shoulder portion 19 and the sidewall 13 to a point approximately midway between the base of the bead portion 15 and the peak 20 of the crown of the non-skid portion.

It is also important that this barrier layer shall have approximately the same physical properties, for example, hardness, flexibility, heat build-up resistance and so on as does the tread portion in order that during the flexing of the tire casing, said barrier will not be subjected to undue strain, leading to its cracking or other failure to the damage of its oil-resistant properties. In a tire employing a tread composition similar to that previously set forth, a suitable barrier composition might be as follows:

| | Parts by weight |
|---|---|
| Neoprene | 100 |
| Magnesium oxide | 4 |
| Altax (benzothiazyl disulfide) | 0.5 |
| Antioxidant (phenyl-beta-naphthylamine) | 1 |
| Stearic acid | 0.4 |
| Channel black | 32 |
| Plasticizer (light process oil) | 7 |
| Zinc oxide | 5 |

In the construction of tires according to the present invention, the well-known method of lamination upon a mandrel, preferably an expansible mandrel, may be employed, the barrier being simply treated as an additional lamina to be interposed between the tread portion and the fabric carcass portion. In order that the most perfect and nearly continuous adhesion be achieved between the barrier portion and the tread portion, however, it has been found desirable to adhere said barrier portion directly to the inner surface of the tread portion prior to the positioning thereof upon the plied carcass portion. In effecting this adhesion, any vulcanizable rubber-like cement, preferably of a neoprene or similar oil-resistant substance, may be applied to the surfaces of the tread portion and the barrier layer to be joined. It has also been found desirable to coat the other surface of the barrier with a similar vulcanizable rubber-like cement prior to the positioning thereof upon the carcass portion. The rubber-like cement employed in this instance may be the same as that employed for adhesion between the upper surface of the barrier and the tread portion; however, since the barrier will act to prevent migration of the oil from the tread portion to the point of contact between barrier and carcass portion, a natural rubber or other oil soluble adhesive substance may be employed at this point. Where all of the outer rubber-like portion of the tire is composed of an oil extended rubber-like material similar to that of the tread portion previously described, the oil-resistant barrier should, of course, completely enclose the fabric carcass portion to protect the same from the migratory effects which are to be anticipated wherever the oil exended composition is employed.

While a butadiene-styrene composition plasticized with petroleum oil and a barrier of neoprene composition have been set forth as examples of material suitable for use in tread and barrier portions respectively, it is to be understood that the principles of the present invention are equally applicable wherever a highly plasticized high viscosity synthetic rubber-like composition is employed, the barrier in such cases being composed of any synthetic rubber-like composition such as polymers of chloroprene, or butadiene-acrylonitrile copolymers which will offer resistance to the migration of the particular plasticizer employed. It is to be further understood that other references to particular examples and preferred embodiments herein have been for purposes of description only and are in no way intended to limit the scope of the present invention and particularly defined in the subjoined claims.

I claim:

1. As an article of manufacture a pneumatic tire comprising a tread portion of a high viscosity butadiene-styrene copolymer plasticized with a petroleum oil, a carcass portion of superimposed cord fabric layers coated with natural rubber-containing compound and a barrier portion disposed between said tread portion and said carcass portion consisting of an oil-resistant synthetic rubber-like composition of the class consisting of polychloroprene polymers and butadiene-acrylonitrile copolymers whereby said barrier portion prevents the migration of the oil within the composition of the tread portion into the carcass portion and a separation of the former from the latter.

2. A pneumatic tire according to claim 1, wherein the tread portion is plasticized with a petroleum oil in the proportions by weight of from 25 to 50 parts of oil to 100 parts of the copolymer.

3. As an article of manufacture a pneumatic tire comprising a tread portion of a high viscosity butadiene-styrene copolymer plasticized with a petroleum oil, a carcass portion of superimposed cord fabric layers coated with an oil soluble rubber composition, and a barrier portion disposed between said tread portion and said carcass portion consisting of an oil-resistant synthetic rubber-like composition of the class consisting of polychloroprene polymers and butadiene-acrylonitrile copolymers whereby said barrier portion prevents the migration of the oil within the composition of the tread portion into the carcass portion and a separation of the former from the latter.

References Cited in the file of this patent

UNITED STATES PATENTS

| | | |
|---|---|---|
| 1,979,947 | Krauch et al. | Nov. 6, 1934 |
| 2,170,947 | Habgood et al. | Aug. 29, 1939 |
| 2,566,328 | Hessney et al. | Sept. 4, 1951 |
| 2,566,329 | Hessney et al. | Sept. 4, 1951 |